Aug. 17, 1965    W. B. FAHRENBACH ETAL    3,200,718
CARTON FORMING MACHINE
Filed Nov. 14, 1962    9 Sheets-Sheet 3

Fig. 3

INVENTORS
Wolfgang B. Fahrenbach
BY Fred E. Helmick
Attorneys

INVENTORS
Wolfgang B. Fahrenbach
BY Fred E. Helmick

Attorneys

Aug. 17, 1965  W. B. FAHRENBACH ETAL  3,200,718
CARTON FORMING MACHINE
Filed Nov. 14, 1962  9 Sheets-Sheet 5

INVENTORS
Wolfgang B. Fahrenbach
BY Fred E. Helmick
Attorneys

INVENTORS
Wolfgang B. Fahrenbach
Fred E. Helmick
BY

Attorneys

United States Patent Office 3,200,718
Patented Aug. 17, 1965

3,200,718
CARTON FORMING MACHINE
Wolfgang B. Fahrenbach, Oakland, Calif., and Fred E. Helmick, 381 Felton Drive, Menlo Park, Calif.; said Fahrenbach assignor to said Helmick
Filed Nov. 14, 1962, Ser. No. 237,474
13 Claims. (Cl. 93—37)

This invention relates to carton forming machines and is concerned more particularly with the provision of an improved machine of this character adapted to forming egg cartons of the type shown in Randles Patent 2,946,497.

Successful automatic machines for forming partitioned egg cartons have been developed heretofore, for example, the machines disclosed in Randles Patent 2,935,917 and in our Patent 3,015,256. Machines of this type generally operate to push or to pull carton blanks through various operating stations in the machine which function to fold the blanks into the final partitioned carton, and to discharge the same in proper sequence for subsequent operations. While such machines are highly successful, the necessity of feeding the blanks in endwise fashion through the machine requires careful attention to tolerances and to feeding in proper sequence, to avoid jamming or choking of the machine. In addition, such machines require considerable space, and consequently are not readily adaptable to use with automatic egg candlers and graders of the type disclosed, for example, in co-pending Scollard et al. application Serial No. 89,275, filed February 14, 1961, and similar automatic machinery.

In general, it is an object of the present invention to improve upon carton forming machines of the above character, particularly with respect to means permitting carton blanks to be folded into completed partition cartons directly out of a hopper for the blanks.

Another object of the invention is to provide a carton forming machine of such character capable of folding the blanks in a simple repetitive operation which requires a minimum of space.

Another object of the invention is to provide a carton forming machine of the above character employing improved means for folding the blanks and for forming and tucking the carton bottom and partitions.

A further object of the invention is to provide such a machine which is adapted to fully automatic or semi-automatic operations, and which is capable of operating in carefully timed sequence.

Another object of the invention is to provide a carton forming machine of the above character which operates in cyclic fashion to pull a carton blank directly from a feed hopper, to fold the same into a completed partitioned carton, and to discharge the same directly from the hopper in a series of successive operating steps.

Other objects and advantages of the invention will be apparent from the following description of the preferred embodiment thereof, as illustrated in the accompanying drawings, in which.

In general, the carton forming machine of the present invention operates in conjunction with a stack of pre-folded, collapsed blanks positioned in a hopper, and broadly functions to fold one blank at a time directly out of the hopper and into a completed partitioned carton. The completed cartons are discharged from the machine for conveyance to a filling machine wherein the cartons are filled with merchandise. As indicated previously, the carton blanks employed in the machine can be of a well known prefabricated type having certain portions die cut and glued to other portions to form a blank suitably adapted to the operations of the machine.

The machine performs the specific functions of opening the carton blanks to a desired box shape, bending or folding a plurality of transverse partitions from one panel of the formed blank, and then folding and tucking an opposite or bottom panel into interlocking engagement with the partitions to form a completed carton. In the preferred embodiment of the machine illustrated, these operations are all performed at a single folding station located immediately adjacent or beneath a hopper or feeding station within the machine. A discharge mechanism, adjacent the folding station, functions to simultaneously eject a formed carton out of the folding station and downwardly away from the feed hopper onto a carton arrestor. The latter deposits the carton in upright position on a discharge conveyor for delivery to subsequent operations.

Figure 1:
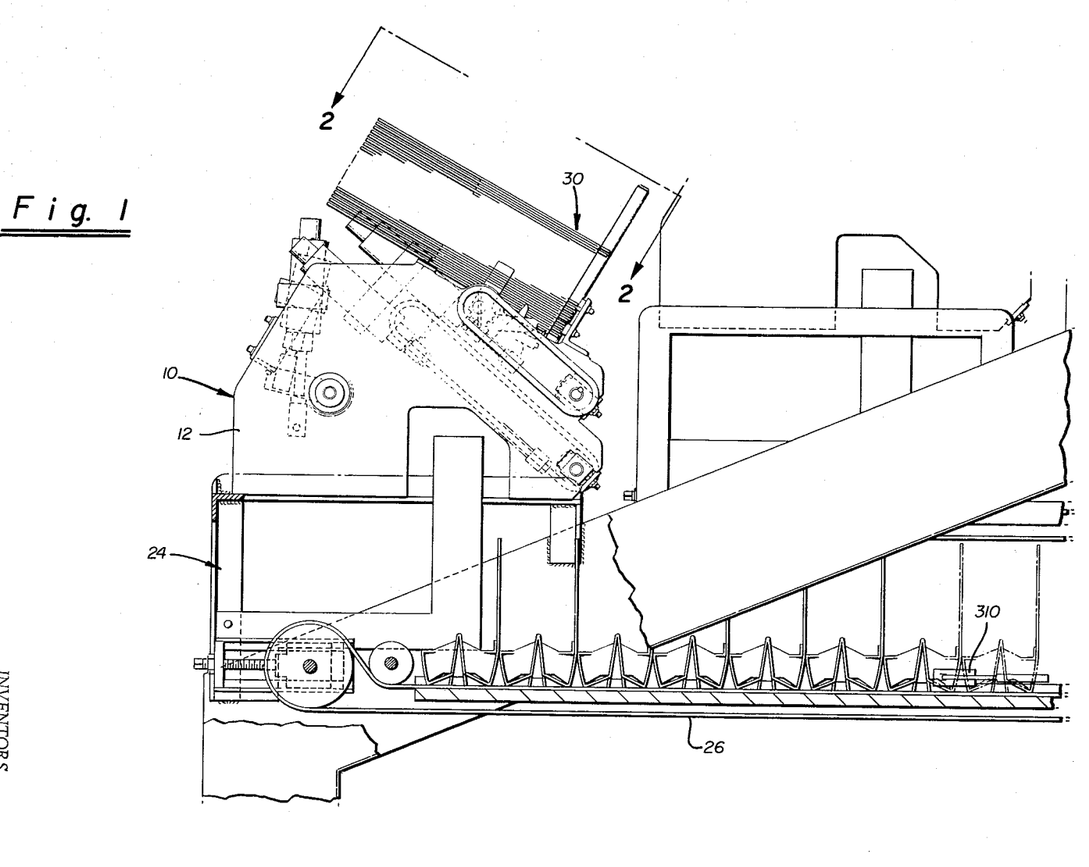
FIGURE 1 is a view in side elevation of a carton forming machine embodying our invention, showing its position in relation to automatic conveyer means adapted to convey completed cartons to other machinery.

Referring to the drawings in detail, 10 indicates a frame including respective side plates 12 and 14 (FIGURES 1 to 3) which are connected adjacent the top by angled transverse frame brackets 16 and 18, and adjacent the bottom by similar frame brackets 20 and 22, and by the base frame 24. The latter provides a support for suitable means forming a discharge conveyer for the completed cartons, represented in FIGURE 1 by the endless belt conveyer 26.

Figure 8:
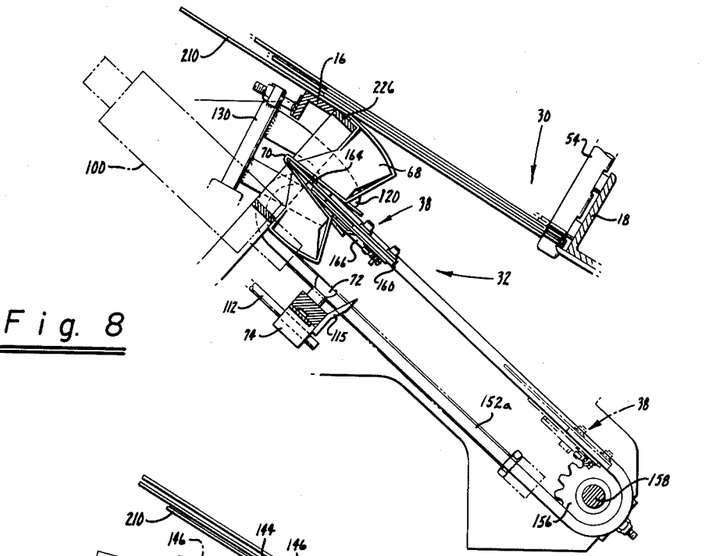
Figure 9:
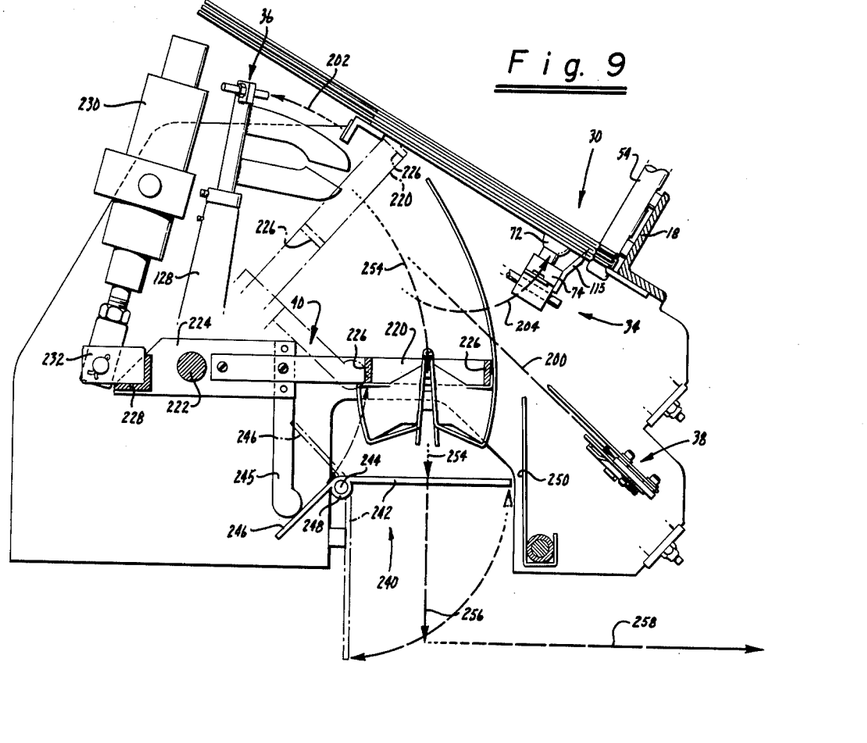
FIGURE 9 is a like view illustrating the operating sequence of the various stations, and particularly illustrating the operation of the discharge mechanism at the moment of discharging a completed carton.

The machine frame 10 provides a mounting for means forming various operating stations within the machine, including a blank feeding station 30 (FIGURES 3 and 4), a folding station 32 including operatively associated blank opening, partition folding and panel interlocking sub-assemblies 34, 36 and 38 (FIGURES 5 to 8), and a discharge mechanism 40 (FIGURE 9). As will be described, the machine functions to periodically engage a carton in lowermost position in the feeding station 30, to open a forward portion thereof downwardly into the folding station 32, and through operation of the opening, folding and interlocking sub-assemblies to fold and tuck the opened portion of the blank into a completed partitioned carton.

Thereafter the discharge mechanism 40 operates through contact with the folded portions of the carton, to pull and eject remaining unfolded portions of the carton down and away from the feeding station.

Figure 16:
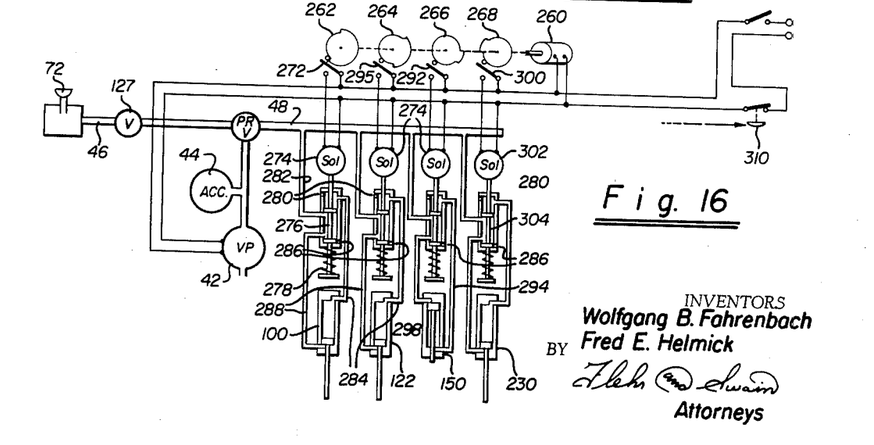
FIGURE 16 is a schematic view of a control system for the machine.

The illustrated machine is designed for operation in conjunction with a reduced pressure or vacuum system in which a suitable vacuum pump, illustrated at 42 in FIGURE 16, is employed to exert continuous suction through the accumulator 44 and vacuum line 46 leading to the blank opening sub-assembly 32, and through the vacuum line 48 leading to the various operating cylinders of the machine, as will be described. The machine can also be designed to operate in conjunction with a positive pressure system for the operating cylinders, in which compressed air or other gaseous fluid, or, alternatively, oil, water, or other hydraulic fluid is used instead of the suction in line 48.

BLANK FEEDING STATION

Figure 2:
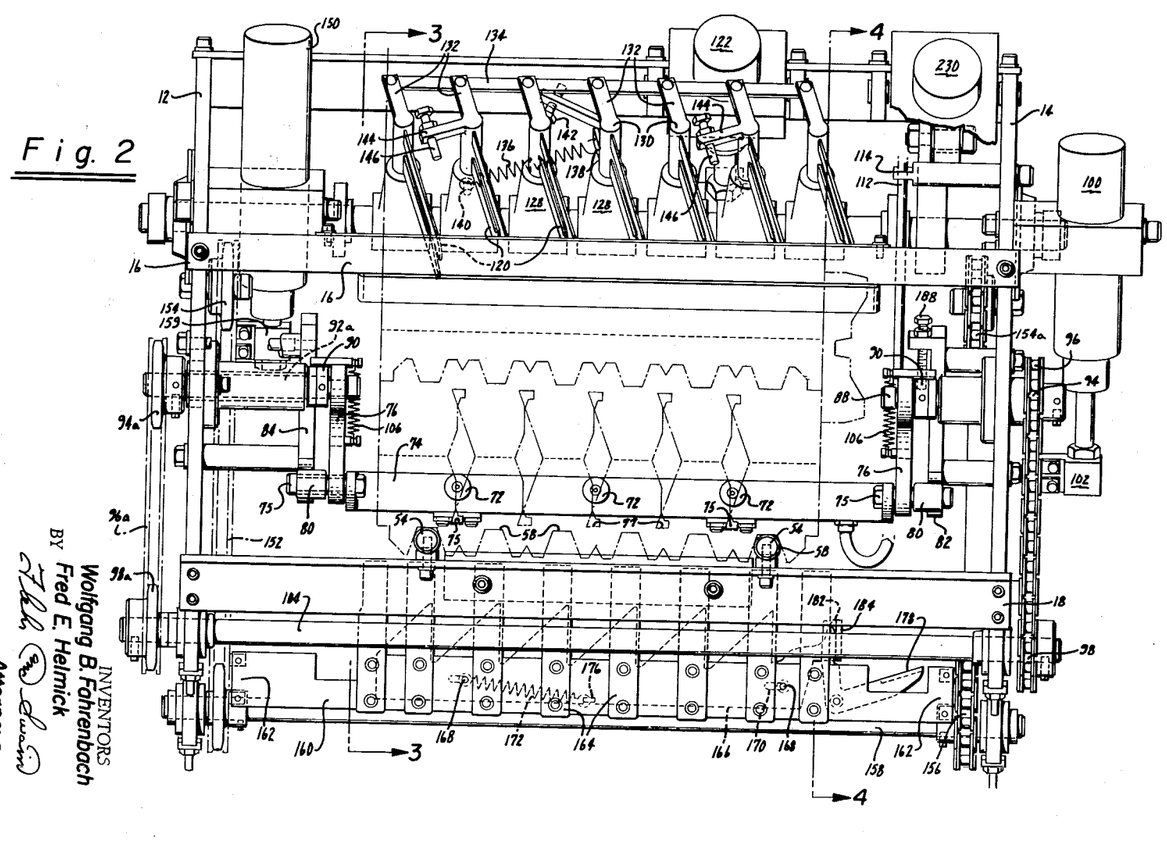
FIGURE 2 is an enlarged plan view along the line 2—2 of FIGURE 1.
Figure 3:
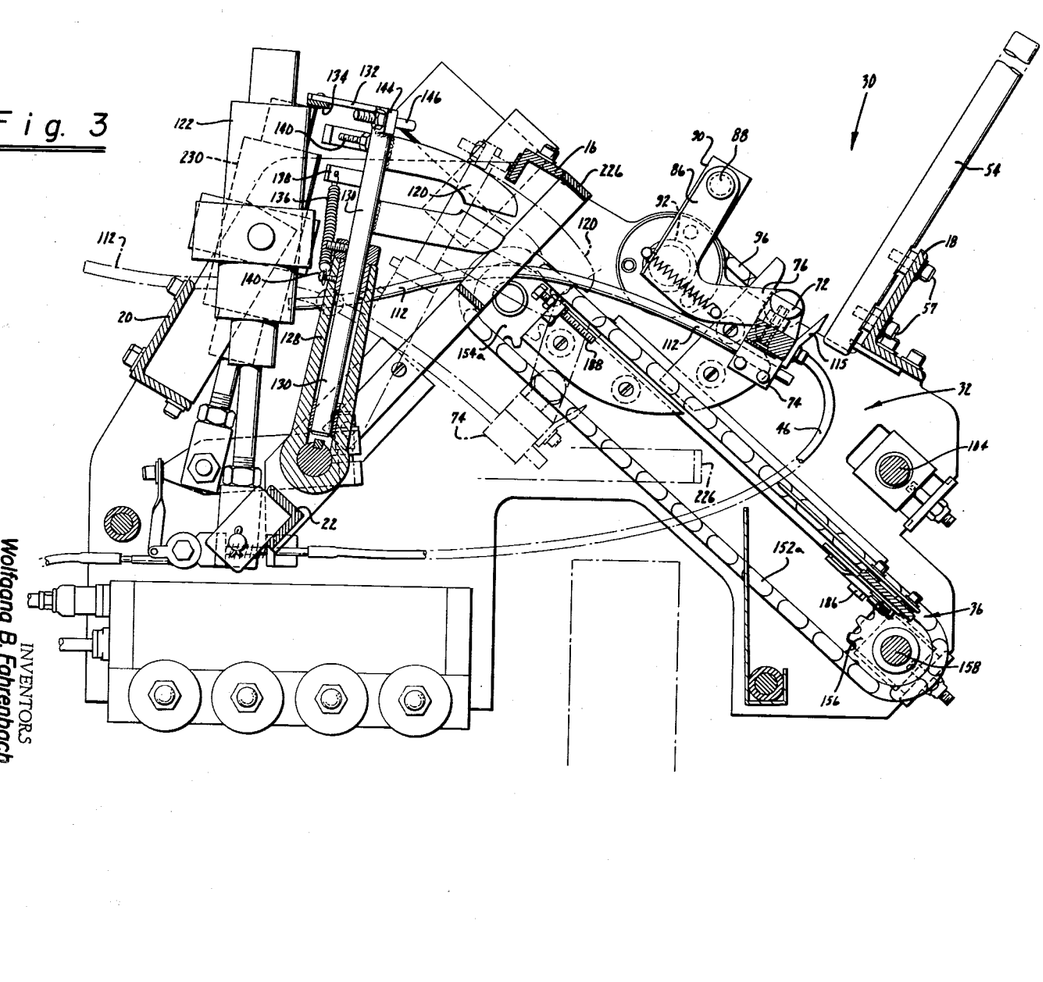
FIGURE 3 is a view in section and in elevation along the line 3—3 of FIGURE 2.

The blank feeding station 30 (FIGURE 3) performs the relatively simple function of supporting a stack of carton blanks 50 (FIGURE 4) in such fashion that the forward portion 52 of the lowermost blank in the stack can be opened downwardly for the subsequent operations performed at the folding station. As best seen in FIGURES 2 and 3, the station 30 comprises a pair of upstanding cylindrical guide members 54 which cooperate with the transverse frame bracket 16, and toe plate 56, to form a hopper. The cylindrical guides 54 are suitably supported on the cross frame member 18 by the means 57. The frame 18 also provides a support for the toe plate 56, which is mounted in spaced relation between the upstanding guides (note FIGURE 2).

In the operations at the feeding station, the lowermost blank is supported at its forward edge by the toe plate 56, and by abutment against the upstanding guide members 54 which are received within the slots 58 provided in the leading edge of the carton blank. This blank is also supported by the transverse frame 16, at a point slightly to the rear of its center of gravity. The remaining blanks in the stack 50 are supported upon the lowermost blank and by engagement with the upstanding guides 54, in the manner shown in FIGURE 4. This relationship concentrates a substantial portion of the weight of the stack upon the portion of the blank resting on the upper surface 60 of the cross frame member 16 which, as will appear, functions as a fulcrum in the subsequent folding operations. In general, the operations at the feeding station 30 require the presence of several carton blanks within the hopper to insure a proper support and distribution of weight upon the lowermost blank, adjacent the fulcrum 60.

BLANK FOLDING STATION

The folding station 32 (FIGURES 4 to 8) functions to engage the forward portion 52 of each carton blank in succession as it reaches the lowermost position in the hopper at the feeding station 30, and to bend it downwardly and subject it to the various forming, folding and tucking operations necessary to form the completed carton. These various operations are performed by the previously mentioned sub-assemblies which are associated with the folding station. Specifically, the opening or box forming sub-assembly 34 functions to grasp a lower portion of the blank and to bend it downwardly about the fulcrum point 60 in such fashion as to fold lower collapsed portions of the blank into the desired hollow-box form. The partition forming sub-assembly 36 functions to bend a plurality of downthrust partitions in the lower blank portion into a transverse attitude and to hold the same in proper position during the operation of the interlocking sub-assembly 38. The latter sub-assembly functions to fold and tuck an opposed downthrust panel portion of the blank into interlocking engagement with the plurality of partitions to form the completed partitioned carton.

Figures 17, 18, 19, 20, 21:
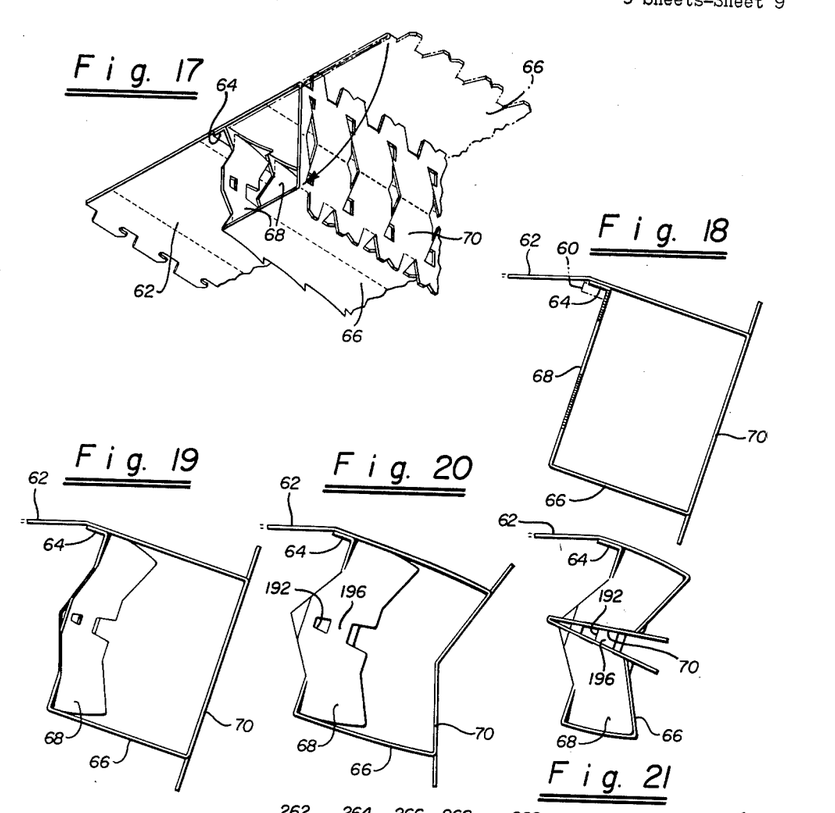
FIGURE 17 is a perspective view of a portion of the carton blank, illustrating the initial opening operation.
FIGURES 18 to 21 are views in elevation showing the sequence of steps involved in folding the component parts of a formed carton into interlocking engagement to form a completed partitioned carton.

Referring to FIGURES 17 to 21, it will be seen that each carton blank comprises a main panel 62 which is die cut in predetermined manner, and to which is secured along a gluing strip 64 extending transversely of the panel, a lower collapsed or folded portion 66. This lower portion 66 is appropriately die cut so that, upon being opened, a plurality of partitions 68 are provided which can be bent into a transverse attitude, for example as in FIGURES 18 to 20. The lower portion 66 is also provided with a foldable panel portion 70 which is provided with a plurality of segments adapted to be folded and tucked into engagement with the transverse partitions 68 to interlock the same into a formed completed carton, as represented in FIGURE 21.

Blank opening sub-assembly

The blank opening sub-assembly 34 generally employs a plurality of suction cups 72, rigidly supported on a cross head 74. As best seen in FIGURE 2, the cross head is mounted for pivotal movement on pivot shafts 75 carried by a pair of rocker arms 76. The pivot shafts 75 also carry rollers 80 which cooperate with cam segments 82, 84 mounted in spaced relation upon the side plates 12 and 14. Referring to FIGURE 3, the rocker arms 76 have bent arm portions 86 which are pivotally attached at 88 to the distal ends of cranks 90 carried by actuator shafts 92 and 92a. The latter are in turn keyed for rotary movements with sprockets 94 and 94a, engaged in chain drives 96 and 96a, on either side of the machine.

With particular reference to FIGURE 2, the sub assembly 34 is energized by the operating cylinder 100 through the chain drive 96. The piston of this cylinder is connected to the lower reach of the chain, at 102, and functions through reciprocatory movements of the chain to impart reversible rotary movements to the drive sprocket 94, and to an idler sprocket 98. The latter is keyed to the cross shaft 104, and serves to rotate the corresponding idler sprockets 98a and drive sprocket 94a on the opposite side of the machine. As particularly shown in FIGURES 4 to 6, operation of the air cylinder 100 to retract the piston from an extended position will cause the cranks 90 to rotate in a clockwise direction through an arc of approximately 130°, due to rotation of the drive sprockets 94, 94a and their stub shafts 92, 92a.

Referring again to FIGURE 3, the suction head 74 is mounted on the rocker arms 76 in such fashion that pivoting of these arms will cause the suction cups 72 to follow a prescribed opening path determined by the cam segments 82 and 84. This operation is particularly shown in the sequence positions of the blank opening sub-assembly shown in FIGURES 4 to 6. It will be noted that the cam followers 80 on the ends of the rocker arms are held in engagement with the cam segments by means of springs 106, attached at their inner ends to base portions of the cranks 90, and at their outer ends to the extending portions of the rocker arms 76. As a result of this construction, actuation of the rocker arms initially causes the suction cups 72 to pull the forward end of the lowermost carton blank downward off the toe plate, and forward, as the cam followers 80 proceed along the flattened portions 108 of the upper cam segments 82. This operation, particularly illustrated by the sequence positions of FIGURES 4 and 5, initially releases the forward portion of the carton blank from the toe plate 56 in the feeding station, and advances the entire carton blank a slight amount (represented at 110 in FIGURE 5) to properly align the blank for the subsequent opening and folding operations. As the suction cups 72 follow the surfaces of the cam segments 82, 84, they function to open the carton blank downwardly into the desired hollow box formation shown in FIGURE 6. To insure that the suction cups are at all times properly oriented to the carton blanks during these operations, the cross head 74 is provided with a vertically extending pivot control rod 112, which is adapted to be received in an apertured guide element 114 mounted on the side plate 14. The shape of the control rod 112 is such that the pivot aspect of the suction elements 72 at all times insures a maximum application of suction to the collapsed portion 52 of the blank, to pull it downwardly and rearwardly into open position.

It will be understood that the vacuum line 46 (FIGURES 3 and 16) exerts a continuous suction through each of the suction elements 72 so that the latter immediately grasp a carton blank placed in lowermost position in the hopper. This suction is only broken by subsequent operations to fold the blank into the completed partitioned carton, as will appear. It may be noted that the cross head 74 carries a pair of upstanding fingers 115 which project through die cut openings 77 in the lowermost carton blank. These fingers assist in properly positioning the blanks in the feed station, in moving the lowermost carton forward prior to the opening operation, and in preventing the suction cups 72 from slipping on the surface of the carton during the opening operation.

*Partition folding sub-assembly*

The partition forming sub-assembly 34 (FIGURES 2, 3, 10, and 11) comprises a plurality of partition engaging plates 120 which are adapted to be moved in fore and aft and sidewise pivotal relation with respect to the folding station 32. This sub-assembly is controlled by the air cylinder 122 which operates upon its return stroke to pivot a crank 124 about the cross shaft 126, and thereby impart a forward pivotal or rocking movement to the arms 128 carrying the partition engaging plates 120. As best illustrated in FIGURE 3, each of the arms 128 is internally recessed to pivotally receive a rod support 130 for the upper and lower segments of a partition engaging plate 120. The support rods 130 are additionally provided with rearwardly extending crank elements 132 connected for movements in unison by means of a cross bar 134. The plates 120 are normally held in the position shown in FIGURE 2 by means of a spring 136 attached to an arm 138 on one of the pivot rods 130 and to a screw 140 on one of the pivot arms 128. As particularly shown in FIGURE 2, the entering angle of the plates 120 is determined by cooperation of the spring 136 and an adjustable stop 142 carried on one of the pivot rods 130.

Figure 7:
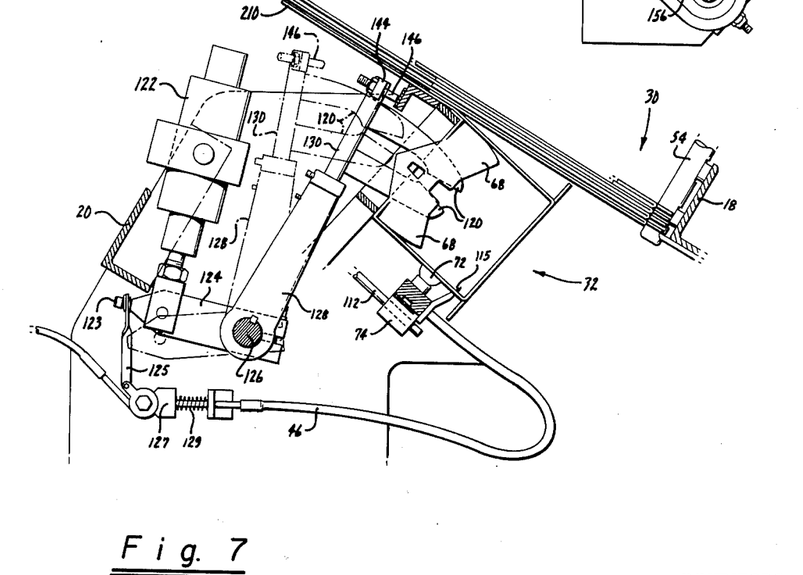
FIGURES 7 and 8 are like views along the line 3—3 of FIGURE 2, illustrating further steps in the operation of the blank feeding and folding stations.

Referring again to FIGURE 2, at least two of the pivot rods 130 carry tripping levers 144 provided with adjustable contact members 146. As illustrated in FIGURE 7, these members function upon forward movement of the pivot arms 128 to engage the cross support 16, and thereby to rotate the rods 130 and plates 120 in a clockwise direction (as viewed in FIGURE 2). It will be understood that this rotary movement (shown in sequence in FIGURES 10 and 11) occurs only at the end of the forward rocking movement of the pivot arms 128 (see FIGURE 7), and that the amount of rotary movement is relatively small (compare FIGURES 10 and 11).

Referring to FIGURES 18 to 20, the initial movement of the pivot arms (up to the moment of contact of the stop 146 with the cross frame 16), causes the plates 120 to engage and partially bend the partitions 68 as particularly illustrated in FIGURE 19. Subsequent movement of the pivot arms 128 causes the stops 146 to shift the cross bar 134, so that each of the plates 120 is rotated clockwise to deflect the partitions 68 into the desired transverse positions shown in FIGURES 11 and 20, and also in FIGURE 7.

It will be noted that the crank 124 is provided with a rear extension 123 to which is secured a valve operator 125 for a valve 127 in the vacuum line 46. Throughout the blank opening operation, and during intermediate rest positions of the machine, it is desirable that the vacuum line exert a continuous suction through the cups 72. However, during the partition folding and bottom interlocking operations, it is preferable to close the vacuum line to prevent interference through action of the suction cups. This is accomplished by movement of the crank extensions 123 and valve operator 125 to close the valve 127, as the partition forming plates 120 are moved forward into engagement with the opened carton blank. During the partition forming operation, the forward pressure of the plate 120 is resisted by the presence of the fingers 115 within the openings 77 of the blank, and by the weight of the stack of blanks upon the unfolded blank portion 210 above the fulcrum 60. As will be explained, when the carton has been completely formed, the partition forming sub-assembly is retracted causing the valve 127 to again open, through the action of the spring 129, restoring suction to the cups 72.

*Bottom interlocking sub-assembly*

The sub-assembly 36 (FIGURES 2, 3, and 8) functions to drive the foldable bottom panel 70 of the carton blank between and into interlocking engagement with the transversely positioned partitions 68. This sub-assembly is operated by the air cylinder 150, through the chain drives 152 and 152a, which impart to and fro planar movement of the operating components of the interlocking sub-assembly.

As best seen in FIGURE 2, the chain drives 152, 152a are supported on sprockets 154, 154a mounted on suitable stub shafts provided in the side plates 12 and 14, and sprockets 156, 156a carried by the cross shaft 158. The drive 152 is attached to the piston of the operating cylinder 150, at 159 (FIGURE 2).

In the illustrated apparatus, the interlocking sub-assembly comprises a cross head member 160 having ends 162 supported on the cooperating chain drives 152, 152a. The cross head carries a plurality of sharpened driver elements 164, operable (in the full line position of FIGURE 8) to tuck the segments of the foldable bottom panel 70 between the partitions 68. The cross head 160 also supports a slide member or interlocking device 166, which is slidably supported on headed pins 168 protruding from the cross head and received in slots 170 provided in the slide member. The latter is normally biased to the left, as viewed in FIGURE 2, by means of a spring 172 connected at one end to one of the pins 168, and at the other to a pin 176 on the slide member.

Figures 4, 5, 6:
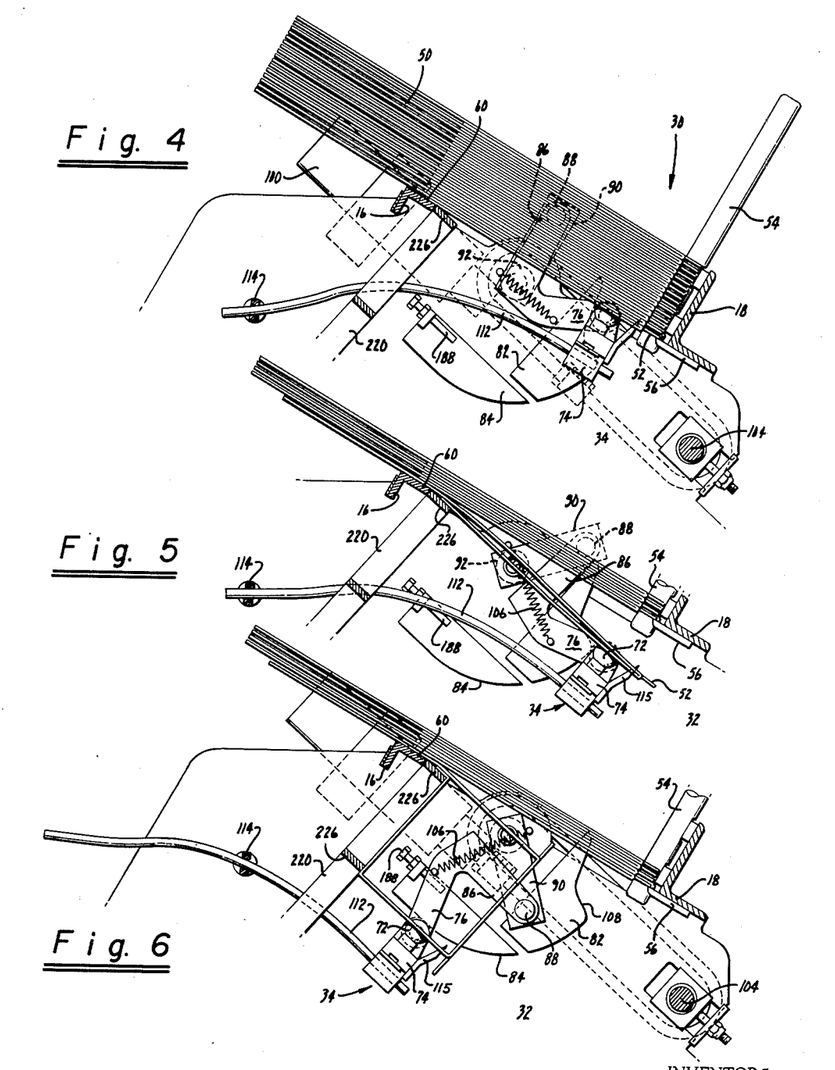
FIGURES 4 to 6 are fragmentary schematic views along the line 4—4 of FIGURE 2, illustrating steps in the operations of the blank feeding and folding stations.
Figure 10:
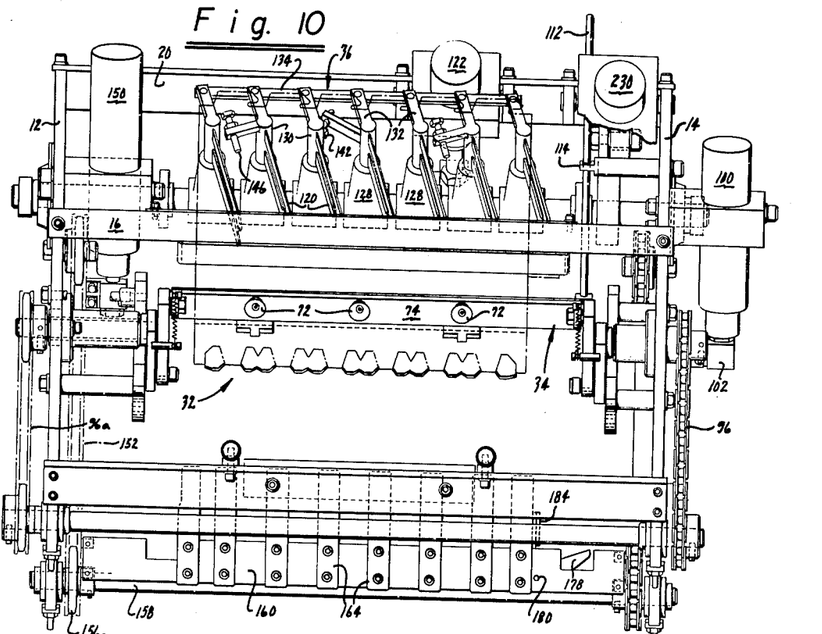
FIGURES 10 and 11 are plan views, similar to FIGURE 2, illustrating steps in the operation of partition forming means at the blank folding station.
Figure 11:
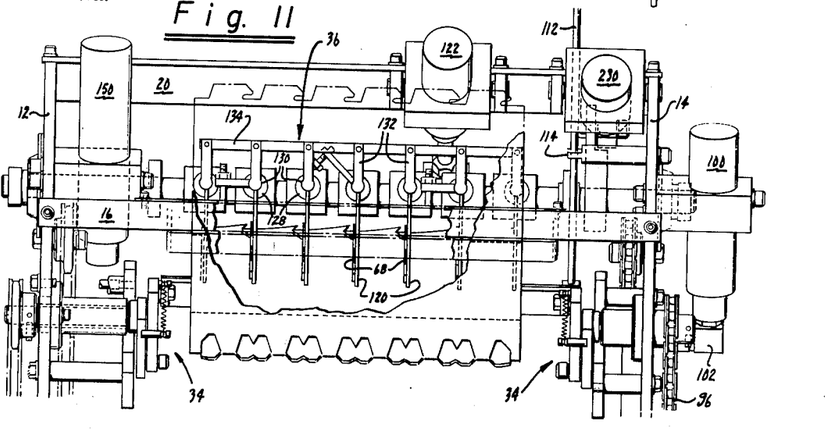
Figure 12:
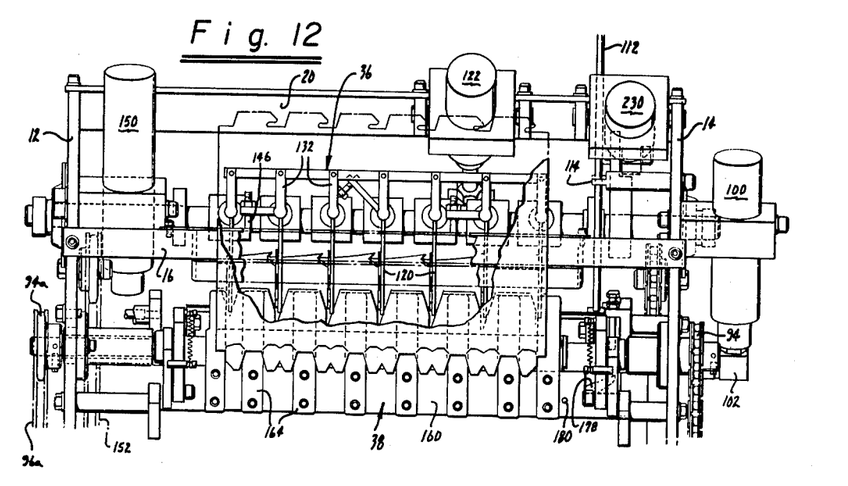
FIGURES 12 and 13 are like views illustrating steps in the operation of bottom tucking means at the blank folding station.
Figure 13:
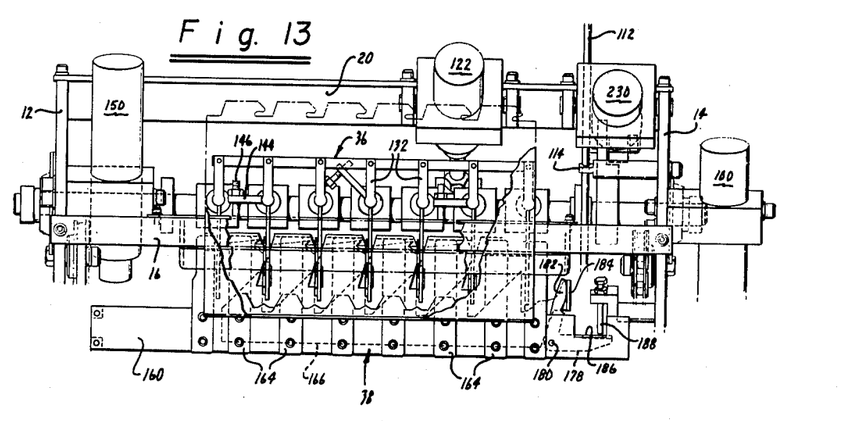
Figure 14:
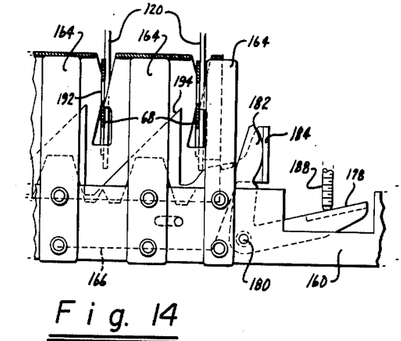
FIGURES 14 and 15 are enlarged detail views, illustrating the operation of the bottom tucking mechanism.
Figure 15:
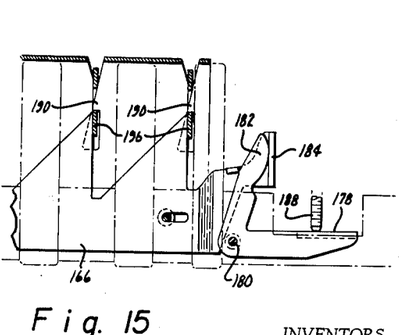

As particularly shown in FIGURES 14 and 15, the slide member 166 is actuated by a trigger 178 pivoted on the cross head 160, at 180. The trigger includes a projecting crank 182 adapted to engage a flanged projection 184 on the cross head 160, and has a downwardly protruding flange 186 adapted to engage an adjustable actuator 188 supported in appropriately spaced relation on the side plate 14. It may be explained that movement of the cross head 160 from an outthrust position on the chain drives (as represented in FIGURES 3, 4 and 10), to an initial tucking position (as represented in FIGURES 12 and 14) will cause the drivers 164 to force the foldable segments of the panel 70 between the partition 68. However, as particularly shown in FIGURE 14, this initial movement does not necessarily interlock the tabs 190 of the bottom panel with the openings 192 in the partitions. This latter function is achieved by the final movement of the cross head, which causes the trigger 178 to engage the actuator 188 to shift the slide member 166 to the position shown in FIGURES 13 and 15. It will be noted that the slide member 166 is provided with a plurality of teeth 194 which engage intermediate portions 196 of the partitions, forcing them sideways so that the projections 190 enter and interlock within the openings 192 (note FIGURES 20 and 21).

At this point in the operation, as will be more fully explained, the cylinder 150 operates to return the interlocking sub-assembly 38 to its original extended position, the air cylinder 122 operates to retract the partition forming sub-assembly 36 and the cylinder 100 operates to pivot the suction cups 172 of the blank opening sub-assembly 32 upward into contact with the lowermost blank in the feed station 30. This sequence of operations, illustrated by the arrows 200, 202 and 204 in FIGURE 9, properly positions the various sub-assemblies at the folding station 32 to permit subsequent operation of the discharge mechanism 40 to eject the completed partitioned carton.

DISCHARGE MECHANISM

As has previously been explained, only the forward portion 52 of the lowermost carton blank in the feed hopper is opened downwardly and formed and tucked into the body of a completed carton. The unfolded rear or cover portion 210 of the carton remains in position beneath the stack of cartons 50, and in frictional engagement with the upper surface or fulcrum 60 of the cross frame 16. This relation is particularly shown in FIGURES 5 to 8.

The discharge mechanism 40 functions to engage the folded portions of the carton, and to pull the unfolded cover portion 210 from beneath the stack of cartons 50, and thereafter to eject the carton in upright position for deposit on the discharge conveyor 26. Referring to FIGURE 9, the discharge mechanism is seen to comprise a pair of upstanding pivot arms 220 supporting a pair of cross arms 226, and mounted for rotation on the cross shaft 222 by means of the bracket supports 224. As illustrated in FIGURES 4 to 8, the upper cross arm 226 is normally positioned adjacent the cross frame member 216 where it assists this member in forming the fulcrum 60. During the discharge operation, the arms 226 engage the folded portions of the carton in the manner illustrated in FIGURE 9.

The mounting brackets 224 for the pivot arms are transversely connected by means of a cross member 228, which carries a lever 232 pivotally connected to the piston of the operating cylinder 230. The latter functions (on the upstroke) to pivot the arms 220 downwardly to the discharge position shown in the full lines in FIGURE 9, and immediately thereafter (on the downstroke) to return the discharge mechanism to its rest position. In the latter position, the machine is ready for folding operations to be performed on the next carton blank in sequence, as previously described.

The present machine is particularly adapted to providing a continuous supply of open erect cartons to subsequent filling operations, for example, as practiced with automatic egg handling and grading apparatus of the type disclosed in the aforementioned Scollard et al. application Serial No. 89,275. Successful operation of such machines depends upon a virtually continuous uninterrupted supply of cartons to insure that eggs or other merchandise are not fed to the filling station at a time when no carton is present, or the carton is kicked over or otherwise incapable of receiving the merchandise. Accordingly, to insure that the cartons are discharged from the machine and deposited on the conveyor 26 (FIGURE 1) in continuous upright fashion, an arresting mechanism 240 can be provided.

In the illustrated embodiment, the mechanism 240 comprises a pair of spring members 242 mounted on a cross shaft 243 and operable on the downstroke of the discharge arms 220. This operation is accomplished by contact between a kicker foot or actuating member 244 carried by the mounting members 224 and adapted to engage an actuating lever 246 extending rearwardly from the cross shaft support 248 for the members 242. As will be readily understood, the downstroke of the pivot arms 220 will cause the spring members 242 to be elevated to the illustrated solid line position, where they momentarily support the discharged carton. Upright guides 250 are also provided adjacent the supports 242 to properly orient the carton. Upon return of the pivot arms 220 to their uppermost or rest position, the supports 242 cooperate with the guides 250 to gently deposit the carton upon the discharge conveyor 32, in upright position.

CONTROL SEQUENCE

The operating sequence of the machine can be electrically controlled, for example by means of the control circuit shown schematically in FIGURE 16. This circuit, in addition to supplying power to the vacuum pump 42, energizes an electric motor 260 for the rotatably mounted cams 262, 264, 266, and 268.

Operation of the machine is accomplished by depressing button 270, thereby energizing motor 260 to rotate the cams (clockwise as viewed in FIGURE 16). Cam 262 immediately depresses the switch 272 causing the solenoid 274 to retract the spool valve 276 against the pressure of the spring 278. This causes the valve to close the bleed port 280, permitting the vacuum pump 42 to bleed the valve through the lines 282 and 284 so that the blank opening cylinder 100 operates to retract the chain drive for the blank opening sub-assembly 34. This latter operation is facilitated by the simultaneous opening of the vent port 286 so that air is supplied through the line 288 to the lower side of the cylinder 100. Following the blank opening operation, cam 264 operates in similar fashion through switch 290 and its associated solenoid and spool valve assembly, to retract the piston of air cylinder 122. As a consequence, the plates 120 of the partition forming sub-assembly 36 are advanced to form the partitions. Immediately thereafter, the cam 266 actuates its solenoid and spool valve assembly, in virtually identical fashion, causing the air cylinder 150 to actuate the bottom tucking mechanism. However, in this instance, the lines 294 and 298 are reversed so that the piston of cylinder 150 is extended rather than retracted.

At this stage in the operations, the blank opening sub-assembly 34 has pivoted downward to its opening position (FIGURE 6), the partition opening sub-assembly 36 has moved forward to its holding position (FIGURE 7), and the bottom tucking sub-assembly has advanced to its tucking or interlocking position (FIGURE 8).

The cams 262, 264, and 266 are so constructed that further rotation of the cam shaft causes the switches 292, 290 and 272 to open and de-energize the solenoids 274 in a reverse sequence. This causes the cylinder 150 to initially operate to retract the bottom tucking mechanism, the cylinder 122 to next return the partition opening plates to their back position, and, finally, the cylinder 100 to return the suction cups of the blank opening subassembly to the up position. It will be understood that these operations are accomplished by return of the spool valves 276 to their up position, to close the vent ports 280 and open vent ports 286, thereby causing the vacuum pump 42 to bleed air from the lower ends of the cylinders 100 and 122, and the upper end of the cylinder 150. This particular sequence of operations is represented by the arrows 200, 202 and 204 in FIGURE 9.

With the parts shown in the full line positions of FIGURE 9, continued rotation of cam 268 causes this cam to eventually close switch 300. The latter switch energizes solenoid 302 and spool valve 304 in the manner just described, causing the air cylinder 230 to swing the discharge assembly 40 to its down or discharge position, as shown in FIGURE 9. However, the dimension of the cam projection is such that the switch 300 is almost immediately reopened, causing the cylinder 230 to return the discharge mechanism 40 to its up or rest position. The operating cycle of the machine is now complete, with the cams 262, 264, 266, 268 again positioned to initiate the forming of an additional carton, by operation of the cylinders 100, 122, 150, and 230 in the sequence noted.

Once the machine is started into operation, by depressing the button 270, it will continue automatically to make and deposit cartons on the discharge conveyor 26. However, it is desirable that some means be provided, such as the switch 310 shown in FIGURE 1, whereby the machine will cease making cartons when a sufficient supply is on hand. As shown in FIGURE 16, contact with the switch 310 effects a break in the control circuit so that the machine ceases to operate. In this fashion the machine functions to fold cartons directly out of the feeding station 30, in the quantities actually needed in the subsequent carton filling and closing operations.

MACHINE OPERATION

Reviewing briefly the operation of the machine, it is assumed that the parts are in the positions illustrated in FIGURES 3 and 4, and that a stack of carton blanks 50 has been placed in proper position within the hopper formed by the cross frame 16, toe plate 56 and upright guides 54, at the feeding station 30. The discharge mechanism 38 is thus in position against the cross flange 16 where it assists in providing a folding fulcrum at 60.

In the operating sequence at the folding station 32, the piston of the air cylinder 100 is initially extended by operation of the cam 262. This causes the chain drives 96, 96a, to rotate the cranks 90 of the blank opening subassembly 34 in a clockwise direction, and the arms 76 to rock forwardly and downwardly, as particularly illustrated in FIGURES 4 to 6. The contact between the suction elements 72 and the lowermost carton blank simultaneously pulls the forward end of the blank downward off the toe plate 56, and forward so as to properly position the rear of the blank upon the fulcrum 60. This operation corresponds with movement of the cam followers 80 along the flattened portions 108 of the upper cams 82. Thereafter the rollers 80 follow the smooth curve of the cam surfaces 82, 84, causing the collapsed portion of the carton to open into the hollow box configuration shown in FIGURE 6. Proper following of the movement of the rollers 80 is insured by the spring action of the rocker arm 76 about the pivot points 88 due to action of the springs 106. During this operation, the pivot attitude of the suction cups 72 is maintained in proper relationship to the wall of the opening carton blank by means of the shaped control rod 112 received in the apertured guide member 114. During subsequent operations at the folding station, the cam 262 functions to hold the piston of cylinder 100 in extended position, thereby insuring that the cross head 74 will remain in the down or opening position. However, when the cam 264 operates to retract the piston of the air cylinder 122 (to thereby rock the partition forming subassembly in a forward direction, it also causes lever 124 and valve actuator 125 to close the vacuum line to the suction cups 72. The cylinder 122 simultaneously pivots the partition forming flaps 120 forwardly to initially engage and partially open the partitions 68, as shown in solid lines in FIGURE 19. Immediately thereafter, the actuators 146 strike the cross members 16 causing the pivot rods 130 and the rearward extending levers 132 to pivot the plates 120 in clockwise direction to deflect the partitions 68 sideways into the fully opened or transverse position shown in full lines in FIGURE 7 and in FIGURE 20. During this operation the upstanding fingers 75 on the suction cross head 74 hold the carton blank in proper position, against the pressure of the plates 120.

When the air cylinder 122 has completed its upstroke, the cam 266 operates to shift the piston of cylinder 150 so that the chain drives 152, 154 move the drivers 164 against bottom panel 70 of the carton. Thereafter the drivers force the segments of the panel 70 between the partitions 68 to an initial position shown in FIGURE 14. At this point the trigger 178 for the shiftable tucking plate 166 engages the adjustable actuator 188, and shifts the slide member 166 to the right, to position shown in FIGURE 15. The effect is to forcibly tuck the bottom panel projections 190 within the openings 192 of the partitions 68, thereby locking these parts of the carton in assembled relation. As the sub-assembly 38 reaches the out-stroke of the cylinder 150, it is almost immediately retracted (arrow 200 in FIGURE 9) through reversal of the cylinder 150, in response to continued rotation of the cam 266. In like fashion, the cam 264 acts to retract the partition forming sub-assembly 36 (arrow 202), and the cam 266 to return the blank opening sub-assembly 34 to its original position adjacent the cross member 16 (arrow 204). During this sequence of operations, the valve 127 is again opened through action of the lever 124 and actuator 125, to induce sufficient suction in the contact units 72 to positively grasp the next blank in lowermost position within the feeding station 30.

When the various folding sub-assemblies have been returned to their original positions, shown in FIGURE 9, the completed carton is discharged from the machine through cooperation of the discharge mechanism 40 (arrow 254), the arresting mechanism 242 (arrow 254), and the discharge conveyor 26 (arrow 256). The discharge mechanism is actuated by the cam 268 which causes the cylinder 230 to swing the cross arms 226 against the folded portions of the carton, pulling the remaining unfolded portions out of the hopper, and thereafter to actuate the arresting mechanism 240 to deposit the carton on the conveyor, in the manner previously described. The completed carton is now discharged from the machine, along with additional cartons in any desired quantity (depending on the spacing of the switch 10), on the conveyor 26.

From the foregoing, it will be apparent that the machine of the invention not only requires a minimum of space in which to feed blanks and in which to discharge completed cartons, but also virtually eliminates the jamming normally associated with endwise movement of blanks and cartons through the machines. Moreover, this trouble free operation can be rapidly and effectively accomplished in a very small space immediately adjacent a feed hopper by the simple operation of pulling a carton blank directly out of the feed hopper into a forming or folding station. There, the machine performs all of the blank opening and forming operations in a space scarcely larger than the completed carton itself, and then discharges the carton by pulling remaining folded portions from the hopper in such fashion that the carton can be deposited upon a discharge conveyor running through the machine. The machine is thus particularly well qualified for use in automated carton forming and supplying operations associated with other automatic machinery, and where available space is at a premium.

While the invention has been illustrated and described in connection with a preferred embodiment, it is capable of other variations and modifications within the scope of the claims.

We claim:

1. In a machine for forming cartons: a feeding station including upstanding guide means and a transverse support means forming a hopper adapted to receive a stack of pre-folded, collapsed, substantially planar blanks; a carton folding station immediately below said feeding station, said folding station including means to periodically engage a carton blank in lowermost position in said feeding station to open a forward portion thereof downwardly about said transverse support means, means to deflect a portion of said opened blank into partitions, and means to fold and tuck another portion of said opened blank between said partitions; said transverse support means resisting the movement of said folding and tucking means to permit the forming of said opened carton portions into a completed partitioned carton, means for holding rear portions of said carton in the feeding station; and discharge means adapted to engage said completed partitioned carton to pull the rear unfolded portions thereof from said hopper and to eject the same.

2. A carton forming machine as in claim 1 wherein said means to periodically engage the lowermost carton blank comprises pivotally mounted suction elements and cooperating means operable to produce a downward and then a rearward movement of said suction elements while maintaining contact of the suction elements with the blank.

3. A carton forming machine as in claim 1 wherein said discharge means includes pivotally mounted contact members normally positioned adjacent said transverse support member but pivotally operable to pull the completed partitioned carton forward and downwardly from the hopper in said feeding station.

4. In a carton forming machine: a feeding station including guide means forming a hopper adapted to receive a stack of prefolded collapsed carton blanks; a carton folding station immediately below said station, said folding station including means to positively grasp a carton blank in lowermost position in said said feeding station to deflect a forward portion thereof downwardly into a hollow box carton form, means to bend a plurality of downthrust partitions of said blank into transverse attitude and means to fold and tuck an opposite downthrust panel of said blank into interlocking engagement with said plurality of partitions to form a completed partitioned carton; and cooperating pivot means forming a stationary support in said folding station during said folding and tucking operations and thereafter a movable discharge means adapted to engage said completed partitioned carton to pull remaining unfolded portions thereof from said hopper to eject the same.

5. In a carton forming machine: a feeding station including upstanding guide means and transverse support means forming a hopper adapted to receive a stack of prefolded substantially planar carton blanks in said hopper; a carton folding station immediately below said feeding station, said folding station including pivotally operable means to positively grasp a carton blank in lowermost position in said feeding station to deflect a forward portion thereof downwardly about said transverse support means into a hollow box carton form, rear portions of said blank being held by the weight of said stack of blanks, means to bend a plurality of downthrust partitions of said blank into transverse attitude, and means to fold and tuck an opposite downthrust panel of said blank into interlocking engagement with said plurality of partitions to form a completed partitioned carton; and pivotally operable discharge means normally positioned adjacent said transverse support means so as to cooperate therewith but movable to engage said completed carton and to pull the same forward and downward to pull remaining unfolded portions of said carton from said hopper, whereby the completed carton is ejected from the hopper.

6. A carton forming machine as in claim 5 wherein said means for bending a plurality of partitions from the blank includes partition engaging components to partially deflect the partitions, and delayed action means causing said partition engaging components to completely deflect said partitions into a transverse attitude.

7. A carton forming machine as in claim 5 wherein said means to fold and tuck the opposite panel into interlocking engagement with the partitions includes relatively movable members to first fold the panel into engagement with the partitions and then to tuck the panel and partitions into interlocking engagement.

8. A carton forming machine as in claim 5 wherein arrestor means and cooperating guide means are positioned adjacent said discharge mechanism to insure discharge of completed cartons in a desired upright position.

9. In a machine for forming cartons: a feeding station including guide means forming a hopper adapted to receive a stack of prefolded collapsed carton blanks; a carton folding station positioned immediately adjacent said feeding station, said folding station including means to periodically engage a carton in lowermost position in said feeding station and to pull the engaged portion down and then to the rear to thereby open the engaged blank portion into a hollow box configuration, means to deflect a portion of the opened blank to form partitions, and means to tuck another portion of said opened blank between said partitions to form an opened partitioned carton; and means to engage the opened folded portions of the carton and to eject remaining unfolded portions thereof from said feeding station.

10. In a machine for forming cartons: a feeding station including guide means forming a hopper adapted to receive a stack of prefolded collapsed carton blanks; a carton folding station positioned immediately adjacent said feeding station, said folding station including means to periodically engage a carton blank in said feeding station and to open a portion thereof away from said hopper, means to deflect a portion of said opened blank to form partitions, and means to fold and tuck a further portion of said opened blank to interlocking engagement with said partitions; said folding station also including means to engage and hold the opened blank against the pressure of said folding and tucking means; and discharge means adapted to engage and move the opened, interlocked carton away from said hopper to thereby eject the same from said feeding station.

11. A carton forming machine as in claim 10 wherein said hopper is composed of front upstanding guides and a lower transverse support member providing an open hopper construction adapted to facilitate loading of blanks into the hopper at a relatively flat angle.

12. A carton forming machine as in claim 10 wherein said discharge means to periodically engage a carton blank in said feeding station includes pivotally mounted suction means and cooperating means operable to produce a downward and then a rearward movement of said suction means to effect opening of the carton blank.

13. A machine as in claim 9 wherein said discharge means cooperates in engaging and holding the opened deflected blank portions against the pressure of said folding and tucking means.

References Cited by the Examiner

UNITED STATES PATENTS

| | | | |
|---|---|---|---|
| 2,699,711 | 1/55 | Mobley | 93—37 |
| 2,700,922 | 2/55 | Jordan | 93—37 |
| 3,015,256 | 1/62 | Fahrenbach et al. | 93—37 |

FRANK E. BAILEY, *Primary Examiner.*